Jan. 6, 1959  R. D. JENNINGS  2,867,484
AUTOMOBILE TRAY OR WRITING DESK
Filed Oct. 11, 1957
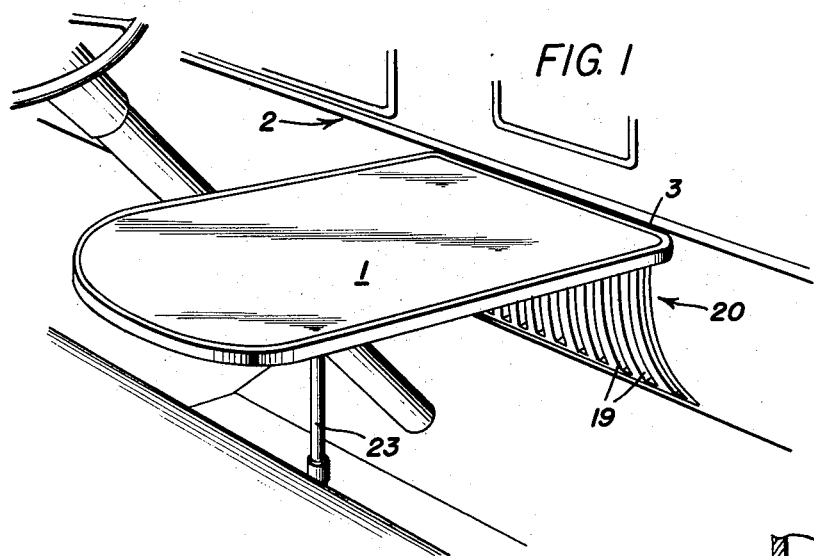
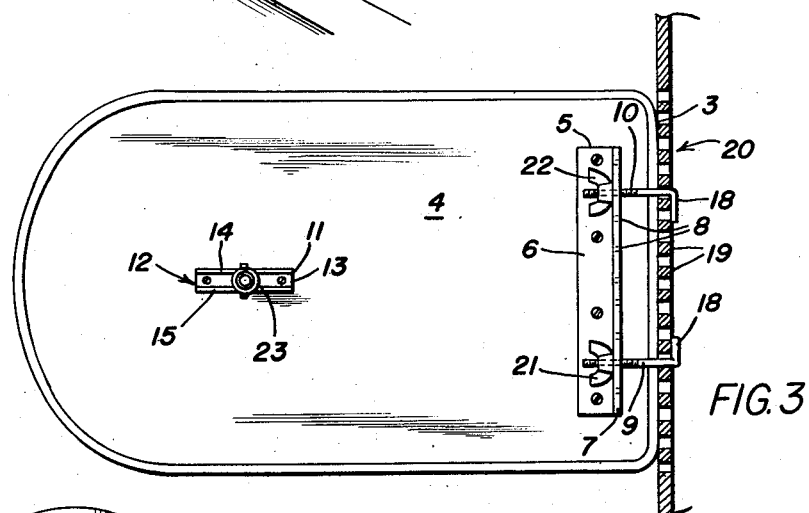
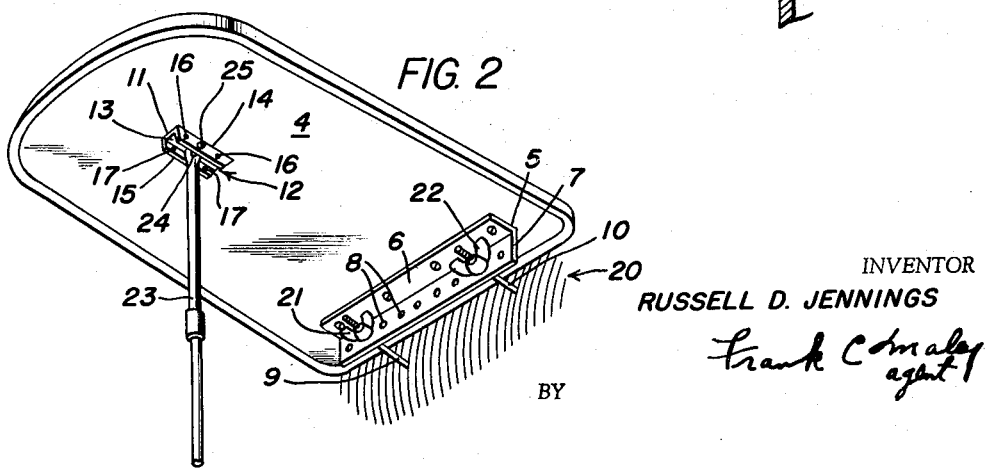
INVENTOR
RUSSELL D. JENNINGS

2,867,484

AUTOMOBILE TRAY OR WRITING DESK

Russell D. Jennings, Bridgman, Mich.

Application October 11, 1957, Serial No. 689,687

1 Claim. (Cl. 311—21)

The present invention relates to writing desks for automobiles and more particularly to a writing desk which may be applied to any late model automobile without requiring modification of the writing desk.

The prior art provides a number of writing desks or tables for automobiles but in substantially all available apparatus of this type, the mounting brackets for the desk or table are either not usable on all models of automobiles or require a skilled individual to apply the support brackets to the vehicle. Specifically, the brackets for attaching the desk or table to the automobile are designed for a specific model of vehicle and therefore are not applicable to all vehicles without modification or if they are readily applicable to all types of automobiles, the brackets are of the type which require considerable skill in securing them to the vehicle. Also many of the brackets employed in attaching these writing desks or tables to vehicles is that they permanently disfigure the vehicle once they are attached thereto.

It is, therefore, a primary object of the present invention to provide an automobile writing desk or table and a novel mounting arrangement therefor which permits the desk or table to be applied to any late model vehicle by an unskilled individual without requiring a bracket to be permanently secured to the vehicle and therefore not requiring permanent disfiguration thereof.

It is another object of the present invention to provide a writing desk or table for automobiles and related vehicles which may be rapidly attached to the vehicle by an unskilled person which may be readily detached from the vehicle and folded into a flat compact assembly.

It is another object of the present invention to provide a writing desk or table for vehicles and more particularly to provide a mounting bracket which is adapted to engage the bars or fins forming the grill work in front of the space provided in substantially all late model automobiles for receiving an automobile radio.

It is another object of the present invention to provide a mounting bracket and assembly for a writing desk or table for motor vehicle which may be adjusted to engage the grill work in front of the space provided in late model automobiles for radios and which may be adjusted to accommodate substantially any spacing of the bars of the grill work.

The above and still further objects, features and advantages of the present invention will become apparent upon consideration of the following detailed description of one specific embodiment thereof, especially when taken in conjunction with the accompanying drawings, wherein:

Figures 1 and 2 are perspective views of the table of the present invention as applied to the dash-board of an automobile; and Figure 3 is a side view of the mounting bolts and bracket employed in the present invention.

Referring specifically to Figure 1 of the accompanying drawings, there is illustrated a writing desk or table 1 adapted to be connected to the dash-board 2 of a motor vehicle immediately adjacent the driver and to his right in cars employing left-hand steering. Obviously, the desk or table would be to the left of the driver in vehicles employing right-hand steering. The table or desk 1 comprises a flat upper surface of any desirable horizontal configuration. In the illustrated embodiment the table has a flat edge 3 adapted to seat against the dash-board 2 and has a generally U-shaped circumferential configuration extending therefrom.

On undersurface 4 of the table 1 and closely adjacent to the edge 3 there is provided a right-angle member 5 having one leg 6 bolted or otherwise suitably secured to the undersurface 4 of the table and having a vertical leg 7 disposed parallel to the edge 3 of the table. The vertical leg 7 of the angle bar 5 is provided with a plurality of apertures 8 adapted to receive therein two bolts 9 and 10 for purposes to be described subsequently. Mounted on the undersurface 4 of the table 1, and disposed centrally thereof and perpendicular to the angle bar 5, is a U-shaped elongated member 11 providing a channel 12 extending perpendicular to the angle member 5 and having a bottom wall 13 and side walls 14 and 15. The U-shaped member 11 is bolted to the undersurface 4 of the table 1 and its side walls 14 and 15 are provided with a plurality of aligned apertures 16 and 17, there being three apertures 16 in the side wall 14 and three apertures 17 in the side wall 15 in the illustrated embodiment of the invention.

When the table is to be applied to a vehicle, the bolts 9 and 10 are inserted in appropriate apertures 8 in the angle bar 5. The bolts 9 and 10 are provided with hook-shaped ends 18 which are adapted to be inserted between and disposed behind appropriate bars 19 of the conventional grill work 20 disposed in front of the compartment provided behind the dashboard for an automobile radio. Thus, in applying the table 1 to the vehicle, two bolts are passed through the aperture 8 having a predetermined spacing from one another and wing nuts 21 and 22 are threaded thereon. The rear edge 3 of the table 1 is disposed at the uppermost edge of the grill work and the hooked ends 18 of the bolts 9 and 10 are inserted between the bars and rotated until the hooks are engaged behind the bars 19. The wing nuts 21 may then be tightened so that the table is held securely against the dash-board.

An adjustable leg 23 is secured to the U-shaped member 11 and is adjusted vertically until the table is supported in a horizontal position. The leg 23 carries at its upper end an aperture 24 and the leg is adapted to be inserted between the side walls 14 and 15 of the member 11 with the aperture 24 aligned with one pair of apertures 16 and 17 in the side walls 14 and 15. A pin 25 is then passed through the apertures 16, 24 and 17 to retain the leg 23 in intimate engagement with the U-shaped member 11.

Another feature of the present invention is that the spacing between the side walls 14 and 15 of the member 11 is approximately equal to the diameter of the leg 23 so that when the table 1 is removed from the vehicle, the leg may be pressed into the channel 12 between the legs 14 and 15 of the member 11 and securely retained therein during non-use of the table.

It may be seen from above that the apparatus of the present invention is readily attachable to any late model motor vehicle since substantially all late model standard vehicles provide a bar or grill work in front of a radio compartment located behind the dash-board. In the apparatus of Figure 2 a vertical grill-work is provided which is more conventional today and the bolts 9 and 10 engage different bars 19. It may be readily seen that the spacing between the bars is of no consequence since the bolts 9 and 10 may be inserted in different ones of the apertures 8 in the bar member 5 until a spacing between the bolts is found that corresponds to a spacing between bars 19 of the grill work 20. The bars illustrated in Figure 2 are shown to be vertical, but these may be horizontal and in such case, the bolts 9 and 10 would engage the same bar. It will be noted that three sets of apertures 16, 17 are provided in a U-shaped member 11 so that the leg 23 may be applied in appropriate location for supporting the outer portion of the table 1 remote from the grill work.

The apparatus provided is extremely simple and may be readily attached to the motor vehicle by unskilled persons in a minimum of time. Correspondingly, the table may be quickly detached and folded and placed out of the way with the leg 23 held in the U-shaped member 11. The bracket assembly employed for attaching the table 1 to the vehicle which bracket assembly includes the bar 5 and the bolts 9, 10 and corresponding wing nuts 21 and 22 is not permanently attached in any way to the vehicle and therefore when the table is removed all signs thereof are also removed from the vehicle.

While I have described and illustrated one specific embodiment of my invention, it will be clear that variations of the details of construction which are specifically illustrated and described may be resorted to without departing from the true spirit and scope of the invention as defined in the appended claim.

What I claim is:

A writing table or desk for motor vehicles comprising a flat rigid member having a top table surface, a bottom surface and at least one edge subsisting between said bottom and said top surfaces, an elongated right-angle bar having a first member secured to the bottom surface of said rigid member and a second member depending downwardly therefrom parallel to and adjacent said at least one edge, a plurality of bolt-receiving apertures extending through said second member perpendicular to said edge, a plurality of bolts each having a hook end and a threaded end, said bolts being of such a diameter to be capable of being received in said apertures and said hook ends of said bolts being of a width less than the spacing between the bars of a grill in the instrument panel of a motor vehicle, a nut for each of said bolts disposed on the opposite side of said second member from said hook ends of said bolts and a vertically positionable leg engageable with the bottom surface of said rigid member remote from said angle member.

References Cited in the file of this patent
UNITED STATES PATENTS

| | | |
|---|---|---|
| 1,756,777 | Wright | Apr. 29, 1930 |
| 2,125,476 | Westrope et al. | Aug. 2, 1938 |
| 2,147,539 | Marchant | Feb. 14, 1939 |
| 2,226,735 | Miller et al. | Dec. 31, 1940 |
| 2,584,557 | Cuthbertson | Feb. 5, 1952 |
| 2,721,777 | Willis | Oct. 25, 1955 |